(12) United States Patent
Young

(10) Patent No.: US 6,542,347 B1
(45) Date of Patent: Apr. 1, 2003

(54) APPARATUS FOR PROTECTING ELECTRONIC EQUIPMENT AND RELATED METHODS

(76) Inventor: Danny J. Young, P.O. Box 1076, Mason, TX (US) 76856

(*) Notice: Subject to any disclaimer, the term of this patent is extended or adjusted under 35 U.S.C. 154(b) by 120 days.

(21) Appl. No.: 09/629,230

(22) Filed: Jul. 31, 2000

(51) Int. Cl.[7] .............................................. H01H 73/00
(52) U.S. Cl. ................................................... 361/115
(58) Field of Search ............................ 361/1, 150, 115, 361/58

(56) References Cited

U.S. PATENT DOCUMENTS

| | | | | |
|---|---|---|---|---|
| 3,525,902 | A | 8/1970 | Davidson et al. | 361/178 |
| 3,553,481 | A | 1/1971 | Hasenbeck | 307/118 |
| 3,961,753 | A | 6/1976 | Sears | 239/64 |
| 3,996,496 | A | * 12/1976 | Volk, Jr. | 361/50 |
| 4,011,483 | A | 3/1977 | Meadows | 361/47 |
| 4,040,436 | A | 8/1977 | Caldwell | 137/78.3 |
| 4,110,807 | A | 8/1978 | Neuhouser | 361/42 |
| 4,298,901 | A | 11/1981 | Weintraub et al. | 361/178 |
| 4,321,643 | A | 3/1982 | Vernier | 361/48 |
| 4,368,498 | A | 1/1983 | Neuhouser | 361/48 |
| 4,791,413 | A | 12/1988 | Lyczek | 340/604 |
| 4,861,940 | A | 8/1989 | Carpenter, Jr. | 174/6 |
| 4,897,606 | A | 1/1990 | Cook et al. | 324/509 |
| 4,922,433 | A | * 5/1990 | Mark | 364/510 |
| 4,931,893 | A | 6/1990 | Glennon et al. | 361/45 |
| 5,060,859 | A | 10/1991 | Bancroft | 239/64 |
| 5,168,212 | A | 12/1992 | Byerley, III et al. | 324/72 |
| 5,207,380 | A | 5/1993 | Harryman | 239/64 |
| 5,291,208 | A | 3/1994 | Young | 342/198 |
| 5,445,176 | A | 8/1995 | Goff | 137/80 |
| 5,521,603 | A | 5/1996 | Young | 342/198 |
| 5,576,695 | A | 11/1996 | Minger et al. | 340/649 |
| 5,721,659 | A | 2/1998 | Young | 361/111 |
| 5,923,516 | A | 7/1999 | Young | 361/111 |
| 6,061,216 | A | * 5/2000 | Fuqua, III | 361/1 |
| 6,266,220 | B1 | * 7/2001 | Lahoud | 361/58 |

* cited by examiner

Primary Examiner—Edward H. Tso
Assistant Examiner—Pia Tibbits
(74) Attorney, Agent, or Firm—Allen, Dyer, Doppelt, Milbrath & Gilchrist, P.A.

(57) ABSTRACT

An apparatus for protecting electronic equipment includes an electrical ground connection in soil and connected to the electronic equipment, and a sensor for sensing an electrical resistance of the electrical ground connection. A dispenser is connected to the sensor for dispensing a liquid into the soil adjacent the electrical ground connection responsive to the sensed electrical resistance being higher than a first threshold to thereby decrease the electrical resistance. The electronic equipment may also be disconnected from a power source based on the resistance of the electrical ground connection.

42 Claims, 2 Drawing Sheets

APPARATUS FOR PROTECTING ELECTRONIC EQUIPMENT AND RELATED METHODS

FIELD OF THE INVENTION

The present invention relates to the field of electronic equipment, and, more particularly, to an apparatus and method for protecting electronic equipment, such as from electrical surges.

BACKGROUND OF THE INVENTION

Electrical power surges result in a substantial amount of damage to electronic equipment every year. Such surges may be the result of lightning or irregularities from a supply source, for example. Surges may enter the equipment through many external connections, such as power lines, coaxial cables, telephone lines, data lines, and low voltage control lines.

To protect against such surges, one traditional approach has been to attempt to dissipate surges using surge suppressor or arrestor devices, such as metal oxide varistors, Surgectors, carbon blocks, thyristors, and gas discharge tubes, for example. Unfortunately, such suppressor or arrestor devices may have a limited capacity to protect against large or repeated surges, and the equipment which remains externally connected may still be damaged.

Another more sophisticated and effective approach is to detect when a likelihood that a surge will occur, such as from an approaching lightning storm, for example. These detectors can disconnect the equipment from an external connection (a "protected state") while the threat of the surge (e.g., a lightning storm) remains present, and reconnect the equipment to the external connection when the threat has subsided. Examples of such more sophisticated protection systems may be found in U.S. Pat. Nos. 5,923,516 and 5,721,659, both entitled "Apparatus for Protecting Electronic Equipment and Associated Method"and assigned to the same assignee as the present invention, and both of which are hereby incorporated herein in their entirety by reference.

Widely used surge suppressors, and lightning rods (for facility protection) are typically completely ground dependent to perform their protection function. In other words, a low resistance electrical ground connection should be available and working at the time of the surge or lightning strike. In addition, a reliable low resistance ground connection is also important to reduce electrical noise in the protected equipment, and is also desirable for radio frequency transmitting and receiving equipment. Unfortunately, the resistance of the ground connection may become relatively high even if initially properly installed. If so, equipment connected to such a high resistance ground may then suffer damage in the event of an electrical surge and/or the equipment may experience increased noise, for example.

SUMMARY OF THE INVENTION

In view of the foregoing background, it is therefore an object of the invention to provide an apparatus and related method which can provide protection even where the resistivity of a ground connection varies and may become too high.

These and other objects, features, and advantages in accordance with the present invention are provided by an apparatus for protecting electronic equipment including an electrical ground connection in soil connected to the electronic equipment, a ground resistance sensor for sensing an electrical resistance of the electrical ground connection in the soil, and a dispenser for dispensing a resistance lowering material into the soil adjacent the electrical ground connection based upon the sensed electrical resistance being above a threshold. As a result, the electrical resistance of the ground connection is maintained at a sufficiently low level to allow power surges to dissipate through the ground connection and thereby avoid damage to the electronic equipment. Noise may also be reduced.

A protection device may further be included for selectively connecting and disconnecting the electronic equipment to and from an external connecting line, such as a power source, based upon the sensed electrical resistance. Hysteresis may be implemented to aid in this switching. In one embodiment, the dispenser may be set to dispense the resistance lowering material for a predetermined time, after which the protection device disconnects the electronic equipment from the power source if the sensed electrical resistance is higher than the threshold after the predetermined time. The resistance lowering material may be water, for example, and the threshold may be in a range of about 10 to 30 Ohms, for example.

Additionally, a power quality monitor may be connected to the protection device for disconnecting the electronic equipment from the power source responsive to surges in the power source. A lightning detector may similarly be connected to the protection device for disconnecting the electronic equipment from the power source responsive to lightning.

An alarm may additionally be included for providing an alert indication based upon the sensed electrical resistance being higher than the threshold. The alarm may be located at the electronic equipment or remote from the electronic equipment. The sensor may comprise one or more sensing electrodes positioned in the soil adjacent the electrical ground connection, in which case the sensor senses a resistance between the sensing electrodes or between a sensing electrode and the electrical ground connection. The dispenser may comprise at least one liquid delivery tube having an outlet adjacent the electrical ground connection.

A method for protecting electronic equipment according to the invention includes connecting the electronic equipment to an electrical ground connection in soil, sensing an electrical resistance of the electrical ground connection in the soil, and dispensing a resistance lowering material into the soil adjacent the electrical ground connection based upon the sensed electrical resistance being above a threshold.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements or steps in alternative embodiments.

Figure 1:
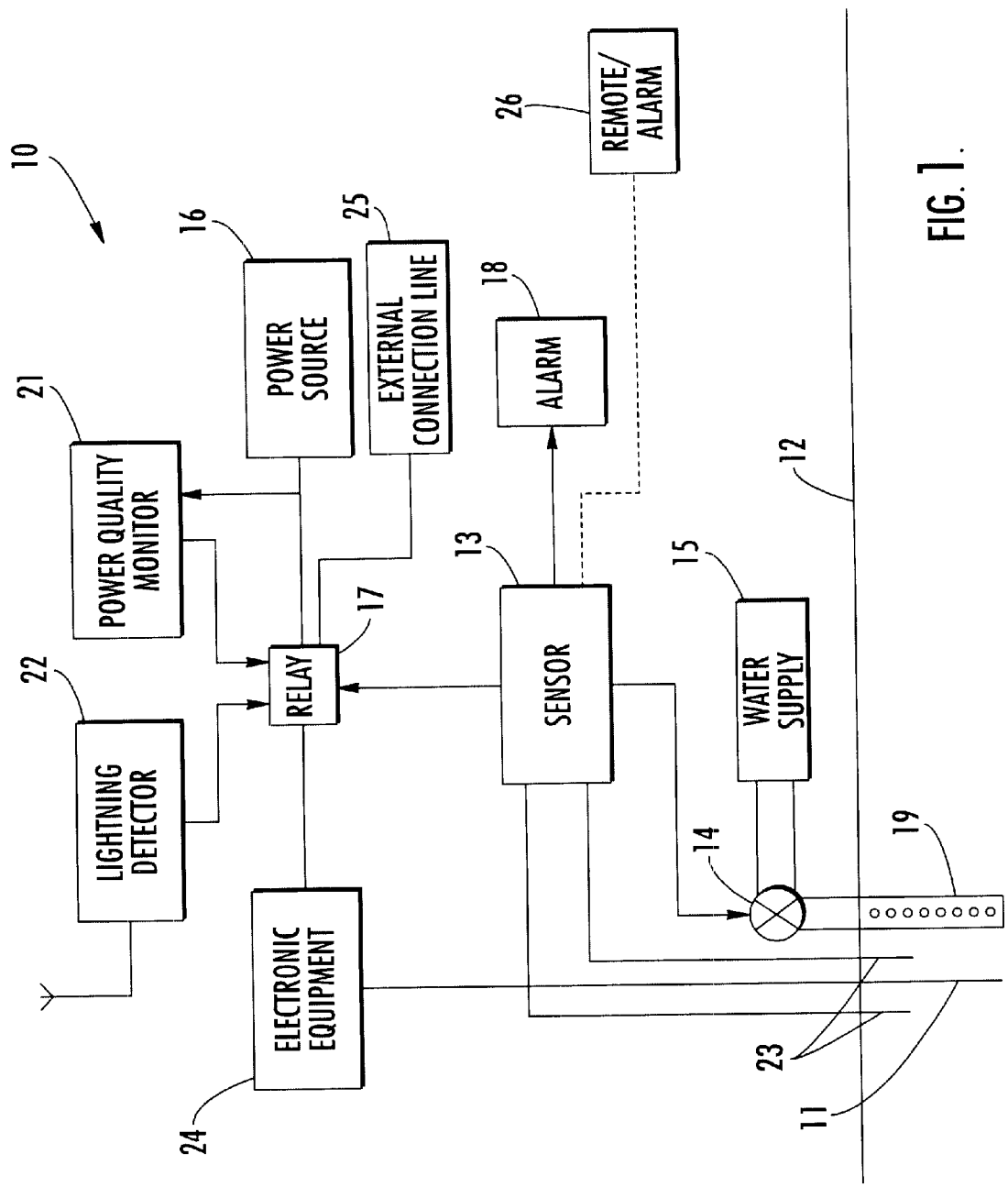
FIG. 1 is a schematic block diagram of an apparatus for protecting electronic equipment according to the present invention.

Turning now to the schematic block diagram of FIG. 1, an apparatus 10 for protecting electronic equipment from power surges is now described. The apparatus 10 includes an electrical ground connection 11 in the soil 12 connected to electronic equipment 24. A sensor 13 is connected to sensing electrodes 23 positioned in the soil 12 adjacent the electrical ground connection 11 for sensing the electrical resistance between the sensing electrodes. Although two sensing electrode 23 are shown in FIG. 1, those of skill in the art will appreciate that a single sensing electrode may be used in conjunction with the electrical ground connection 11 (or more than two sensing electrodes may be used) to sense the electrical resistance.

The sensor 13 may be of a conventional type known to those of skill in the art. The sensor 13 may apply a predetermined voltage to the electrodes 23 and sense a current flow to determine the resistance. Additionally, a dispenser is connected to the sensor 13 for dispensing a resistance lowering material, such as water, into the soil 12 adjacent the electrical ground connection 11 based upon the sensed electrical resistance being above a threshold to thereby decrease the electrical resistance. Other resistance lowering materials known to those of skill in the art may also be used.

The dispenser may include a liquid delivery tube 19, for example, having an outlet adjacent the electrical ground connection 11. As illustrated in FIG. 1, the liquid delivery tube 19 is connected to a valve 14, which in turn is connected to a water supply 15. The valve 14 may be a solenoid valve which is opened responsive to the sensed electrical resistance being above the threshold. Of course, the valve 14 may be opened to varying degrees or operated periodically to control the amount of liquid supplied to the soil 12.

As is typically the case, the electronic equipment 24 may be connected to a power source 16. A protection device such as relay 17 (or other suitable switching devices known to those of skill in the art) may be included in the apparatus 10 for connecting and disconnecting the electronic equipment 24 to and from the power source 16 based upon the sensed electrical resistance. According to one embodiment, the dispenser may dispense the resistance lowering material for a predetermined time, after which the electronic equipment 24 is disconnected from the power source 16 based upon the sensed electrical resistance being higher than the threshold after the predetermined time. The electronic equipment 24 may then be reconnected to the power source 16 responsive to the sensed electrical resistance being lower than the threshold. Furthermore, hysteresis may be implemented in this switching process to avoid multiple disconnections and reconnections from the power source 16 in the event of oscillations of the sensed electrical resistance about the threshold. The electronic equipment 24 may similarly be disconnected from at least one other external connection line 25, such as a coaxial cable, telephone line, data line, or low voltage control line, for example, as will be appreciated by those of skill in the art.

The value of the threshold will depend upon the soil conditions in the particular location in which the apparatus is to be used. By way of example, the threshold will typically be in a range of about 10 to 30 Ohms. Of course, those of skill in the art will appreciate that soil conditions in a particular location may warrant threshold levels greater or lesser than these values, and that the present invention is not limited to any particular range of threshold levels.

An alarm 18 may be included in the apparatus 10 for providing an alert indication based upon the sensed electrical resistance being higher than the threshold. The alarm 18 may be located at the electronic equipment 24, and/or a remote alarm 26 may be located remote from the electronic equipment. Additionally, a power quality monitor 21 may be connected to the relay 17 for disconnecting the electronic equipment from the power source 16 responsive to surges in the power source. Furthermore, a lightning detector 22 may be connected to the relay 17 also for disconnecting the electronic equipment from the power source 16 responsive to lightning. Examples of power quality monitors and lightning detectors that may be included in the present invention are given in U.S. Pat. Nos. 5,923,516 and 5,721,659, noted above. Those of skill in the art will appreciate that other detectors may be used as well.

One method for protecting electronic equipment will now be described with reference to FIG. 2. The method begins (Block 30) by connecting the electronic equipment 24 to the electrical ground connection 11, as shown at Block 31. The sensor 13 then senses the electrical resistance of the electrical ground connection 11 as described above (Block 32) and then compares the sensed electrical resistance to the threshold to determine if the resistance needs to be lowered, as seen at Block 33. If it does not, no action needs to be taken, as shown at Block 34. Of course, in actual application the ground resistance would continually be monitored, but for ease of illustration the method is shown as being terminated at Block 34.

On the other hand, if the sensed electrical resistance is above the threshold, an alert indication may be provided (Block 35) and the resistance lowering material is dispensed into the soil 12 adjacent the electrical ground connection 11, as shown at Block 36. The electronic equipment 24 may then be disconnected from the power source 16, if desired, to put the electronic equipment in a protected state until the electrical resistance can be lowered (Block 37). The sensor 13 then continues to sense the resistance of the electrical ground connection 11, as shown at Block 38, until the resistance is lowered below the threshold. Then, the electronic equipment 38 may be reconnected to the power source 16, at Block 39, completing the method (Block 40).

Figures 2, 3:
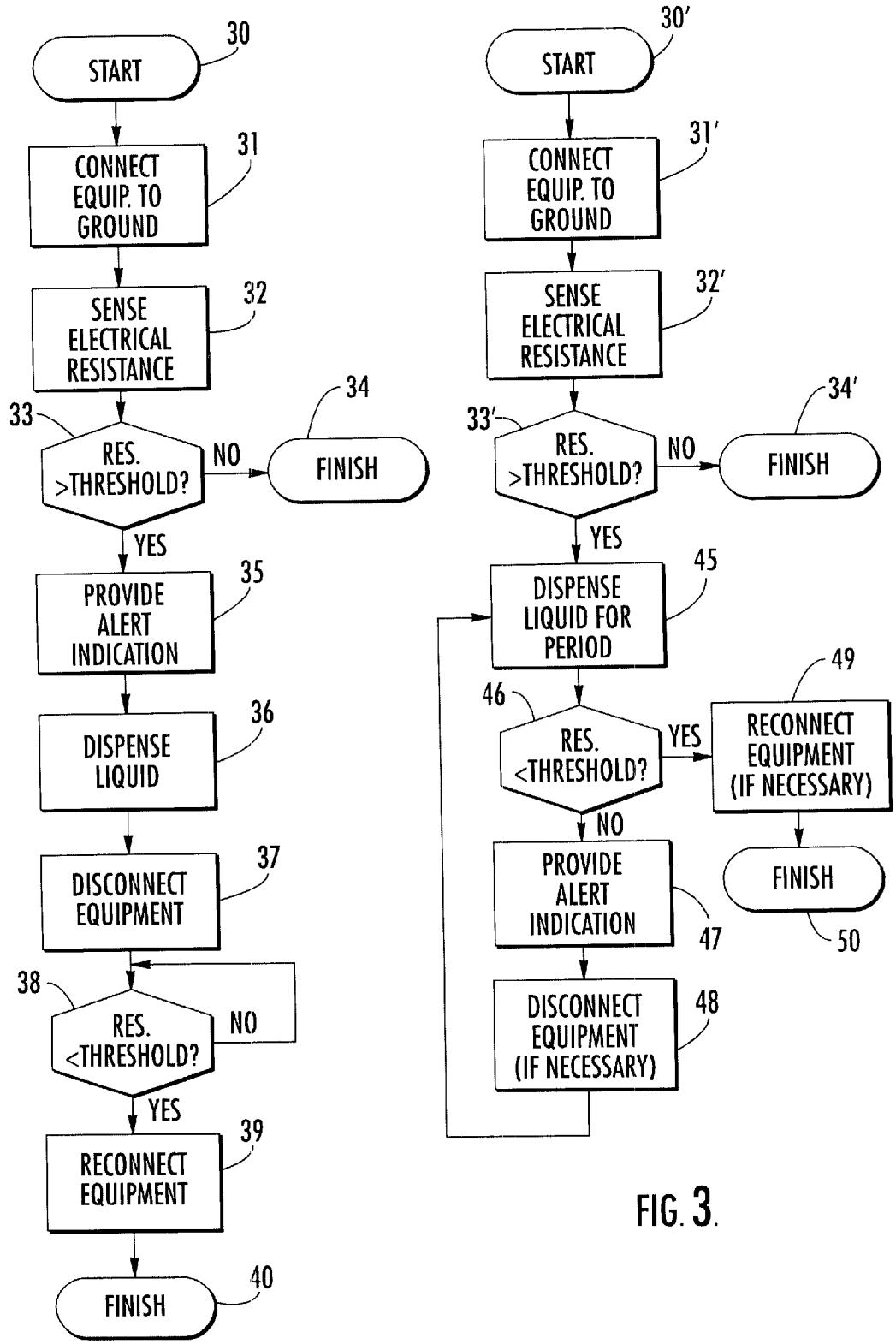
FIG. 2 is a flow diagram illustrating a method of protecting electronic equipment using the apparatus of FIG. 1.
FIG. 3 is a flow diagram illustrating another method of protecting electronic equipment using the apparatus of FIG. 1.

Referring now to FIG. 3, an alternative method for protecting electronic equipment is described. Again, the method begins (Block 30') by connecting the electronic equipment 24 to the electrical ground connection 11 (Block 31') and sensing the electrical resistance thereof, at Block 32', as discussed above. If the sensed electrical resistance is below the threshold (Block 33'), no action is taken (Block 34'). If the sensed electrical resistance is above the threshold, the resistance lowering material is then dispensed for a predetermined time, as seen at Block 45, to avoid the need for disconnecting the electronic equipment 24, if possible. After the predetermined time, the sensor 13 senses the resistance of the electrical ground connection 11, as shown at Block 46.

If the resistance has not been lowered below the threshold, an alert indication is provided (Block 47) and the electronic equipment 24 is disconnected from the power source 16, as seen at Block 48, after an initial alert indication. Liquid is then dispensed for another predetermined time (Block 45) and the resistance is again checked at the end of the predetermined time, shown at Block 46. Once the resistance is lowered below the second threshold, the equipment is reconnected (if it was disconnected as described in the above steps), as seen at Block 49, and the method is complete (Block 50).

It will be appreciated that the above invention provides an apparatus and related method that maintains the electrical resistance of an electrical ground connection at a sufficiently low level to allow power surges to dissipate through the electrical ground and thereby avoid damage to electronic equipment attached thereto. When used in conjunction with one or more surge detectors, the present invention provides a level of protection for electrical and electronic equipment which has heretofore been unavailable in the prior art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for protecting electronic equipment comprising:
   an electrical ground connection in soil and connected to the electronic equipment;
   a ground resistance sensor for sensing an electrical resistance of said electrical ground connection in the soil; and
   a dispenser for initiating dispensing of a resistance lowering material into the soil adjacent said electrical ground connection based upon the sensed electrical resistance being above a threshold.

2. The apparatus of claim 1 further comprising a protection device for selectively connecting and disconnecting the electronic equipment to and from an external connecting line based upon the sensed electrical resistance.

3. The apparatus of claim 2 wherein the external connecting line comprises an electrical power source connecting line.

4. The apparatus of claim 2 wherein said protection device implements hysteresis in switching.

5. The apparatus of claim 2 wherein said dispenser dispenses the resistance lowering material for a predetermined time.

6. The apparatus of claim 5 wherein said protection device disconnects the electronic equipment from the external connecting line based upon the sensed electrical resistance being higher than the threshold after the predetermined time.

7. The apparatus of claim 2 further comprising a power quality monitor connected to the protection device for disconnecting the electronic equipment from the external connecting line also based upon surges in the power source.

8. The apparatus of claim 2 further comprising a lightning detector connected to the protection device for disconnecting the electronic equipment from the external connecting line also based upon lightning.

9. The apparatus of claim 1 wherein the threshold is in a range of about 10 to 30 Ohms.

10. The apparatus of claim 1 wherein the resistance lowering material comprises water.

11. The apparatus of claim 1 further comprising an alarm for providing an alert indication based upon the sensed electrical resistance being higher than the threshold.

12. The apparatus of claim 11 wherein said alarm is located at the electronic equipment.

13. The apparatus of claim 11 wherein said alarm is located remote from the electronic equipment.

14. The apparatus of claim 1 wherein said sensor comprises at least one sensing electrode positioned in the soil adjacent said electrical ground connection; and wherein said sensor senses a resistance between said at least one sensing electrode and said electrical ground connection.

15. The apparatus of claim 1 wherein said dispenser comprises at least one liquid delivery tube having an outlet adjacent said electrical ground connection.

16. An apparatus for protecting electronic equipment comprising:
    an electrical ground connection in soil and connected to the electronic equipment;
    a ground resistance sensor for sensing an electrical resistance of said electrical ground connection in the soil;
    a dispenser for initiating dispensing of a resistance lowering material into the soil adjacent said electrical ground connection based upon the sensed electrical resistance being above a threshold; and
    a protection device for selectively connecting and disconnecting the electronic equipment to and from a power source based upon the sensed electrical resistance.

17. The apparatus of claim 16 wherein said protection device implements hysteresis in switching.

18. The apparatus of claim 16 wherein said dispenser dispenses the resistance lowering material for a predetermined time.

19. The apparatus of claim 18 wherein said protection device disconnects the electronic equipment from the power source based upon the sensed electrical resistance being higher than the threshold after the predetermined time.

20. The apparatus of claim 16 wherein the threshold is in a range of about 10 to 30 Ohms.

21. The apparatus of claim 16 further comprising a lightning detector connected to the protection device for disconnecting the electronic equipment from the power source also based upon lightning.

22. The apparatus of claim 16 further comprising a power quality monitor connected to the protection device for disconnecting the electronic equipment from said power source also based upon surges in the power source.

23. The apparatus of claim 16 wherein the resistance lowering material comprises water.

24. The apparatus of claim 16 further comprising an alarm for providing an alert indication based upon the sensed electrical resistance being higher than the threshold.

25. The apparatus of claim 24 wherein said alarm is located at the electronic equipment.

26. The apparatus of claim 24 wherein said alarm is located remote from the electronic equipment.

27. The apparatus of claim 16 wherein said sensor comprises at least one sensing electrode positioned in the soil adjacent said electrical ground connection; and wherein said sensor senses a resistance between said at least one sensing electrode and said electrical ground connection.

28. The apparatus of claim 16 wherein said dispenser comprises at least one liquid delivery tube having an outlet adjacent said electrical ground connection.

29. A method for protecting electronic equipment comprising:
    connecting the electronic equipment to an electrical ground connection in soil;
    sensing an electrical resistance of the electrical ground connection in the soil; and initiating dispensing of a resistance lowering material into the soil adjacent the electrical ground connection based upon the sensed electrical resistance being above a threshold.

30. The method of claim 29 further comprising selectively connecting and disconnecting the electronic equipment to and from a power source based upon the sensed electrical resistance.

31. The method of claim 30 wherein selectively connecting and disconnecting the electronic equipment comprises implementing hysteresis in switching.

32. The method of claim 30 wherein dispensing comprises dispensing the resistance lowering material for a predetermined time.

33. The method of claim 32 wherein selectively connecting and disconnecting the electronic equipment comprises disconnecting the electronic equipment from the power source based upon the sensed electrical resistance being higher than the threshold after the predetermined time.

34. The method of claim 30 further comprising monitoring the power source and disconnecting the electronic equipment from the power source also based upon surges in the power source.

35. The method of claim 30 further comprising detecting lightning and disconnecting the electronic equipment from the power source also based upon lightning.

36. The method of claim 29 further comprising providing an alert indication based upon the sensed electrical resistance being higher than the threshold.

37. The method of claim 36 wherein providing the alert indication comprises providing the alert indication at the electronic equipment.

38. The method of claim 36 wherein providing the alert indication comprises providing the alert indication remote from the electronic equipment.

39. The method of claim 29 wherein sensing the electrical resistance comprises sensing a resistance between the electrical ground connection and at least one sensing electrode positioned in the soil adjacent the electrical ground connection.

40. The method of claim 29 wherein dispensing the resistance lowering material comprises positioning at least one liquid delivery tube having an outlet adjacent said electrical ground connection.

41. The method of claim 29 wherein the threshold is in a range of about 10 to 30 Ohms.

42. The method of claim 29 wherein the resistance lowering material comprises water.

* * * * *